United States Patent
Bhatti et al.

(10) Patent No.: US 10,489,358 B2
(45) Date of Patent: Nov. 26, 2019

(54) SCHEMAS TO DECLARE GRAPH DATA MODELS

(71) Applicant: CA, Inc., Islandia, NY (US)

(72) Inventors: Bilal M. Bhatti, Islandia, NY (US); Andrew C. Kidder, Islandia, NY (US); Mubdiu Reza Chowdhury, Islandia, NY (US); Avaneesh Srivastav, Islandia, NY (US)

(73) Assignee: CA, Inc., Islandia, NY (US)

( * ) Notice: Subject to any disclaimer, the term of this patent is extended or adjusted under 35 U.S.C. 154(b) by 459 days.

(21) Appl. No.: 15/433,360

(22) Filed: Feb. 15, 2017

(65) Prior Publication Data

US 2018/0232402 A1    Aug. 16, 2018

(51) Int. Cl.
*G06F 17/30* (2006.01)
*G06F 16/21* (2019.01)
*G06F 16/901* (2019.01)

(52) U.S. Cl.
CPC ........ *G06F 16/212* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 5,819,251 A * | 10/1998 | Kremer | ................ | G06F 16/284 |
| 7,818,666 B2 * | 10/2010 | Dorsett, Jr. | ......... | G06F 17/2247 |
| | | | | 715/237 |
| 7,836,066 B2 * | 11/2010 | Chang | ................ | G06F 16/242 |
| | | | | 707/760 |
| 8,161,380 B2 * | 4/2012 | Bar-Or | ................ | G06F 17/227 |
| | | | | 715/205 |
| 2005/0166193 A1 | 7/2005 | Smith et al. | | |
| 2007/0100967 A1 | 5/2007 | Smith et al. | | |
| 2014/0310055 A1 | 10/2014 | Das et al. | | |
| 2014/0358932 A1 | 12/2014 | Brown et al. | | |
| 2015/0154164 A1 | 6/2015 | Goldstein et al. | | |
| 2016/0057733 A1 * | 2/2016 | Grandillo | ............. | H04H 20/423 |
| | | | | 370/252 |
| 2016/0162290 A1 | 6/2016 | Wang et al. | | |
| 2016/0259931 A1 | 9/2016 | Dave et al. | | |
| 2016/0342648 A1 | 11/2016 | White | | |

(Continued)

OTHER PUBLICATIONS

JSON Schema', https://web.archive.org/web/20170101190621/http://json-schema.org/, Jan. 1, 2017, pp. 1 to 2.

(Continued)

*Primary Examiner* — Debbie M Le
(74) *Attorney, Agent, or Firm* — Pillsbury Winthrop Shaw Pittman LLP

(57) ABSTRACT

Provided is a process of validating data to be stored in a graph database, the process including: obtaining a first node to be stored in a graph database, the first node having a relationship to a second node corresponding to an edge; obtaining a node type of the first node having a respective node-type schema; forming a polymorphic schema, based on the node-type schema, specifying criteria to qualify as a valid instance of the node type; validating the first node with the polymorphic schema; and in response to validating the first node, storing the first node and the edge in the graph database.

24 Claims, 5 Drawing Sheets

(56) References Cited

U.S. PATENT DOCUMENTS

2017/0039260 A1  2/2017  Adya et al.
2017/0041341 A1  2/2017  Wang et al.

OTHER PUBLICATIONS

Neo4j: The Worlds Leading Graph Database', https://web.archive.org/web/20170126100341/https://neo4j.com/, Jan. 26, 2017, pp. 1 to 7.
Stackoverflow', https://web.archive.org/web/20150916051837/http://stackoverflow.com/questions/23762424/how-to-represent-the-data-model-of-a-graph, Sep. 16, 2015, pp. 1 to 5.
Structr-Home', https://web.archive.org/web/20170205024106/https://structr.org/, Feb. 5, 2017, pp. 1 to 5.
Dynamic APIs: Negotiating Change', https://web.archive.org/web/20160629121354/http://www.dataversity.net/dynamic-apis-negotiating-change/, Jun. 29, 2016, pp. 1 to 3.

* cited by examiner

SCHEMAS TO DECLARE GRAPH DATA MODELS

BACKGROUND

1. Field

The present disclosure relates generally to computing and, more specifically, to schemas to declare graph data models.

2. Description of the Related Art

In recent years, it has become increasingly common for software developers to use non-relational databases, like graph databases, often referred to as noSQL (for no structured query language) databases. These databases are useful for organizing certain types of data that present challenges in other forms of databases. For instance, often graph databases are particularly well-suited for data in which relationships between entities are of particular importance, e.g., relative to attributes of the entities. In contrast, such use cases are often challenging for relational databases, which are often chosen where the entities tend to be of greater importance. The relative importance of entities or relationships depends generally upon the use case and the information reflected in the database. For example, in a system in which the database will be relatively frequently queried for relationships between entities, those relationships may warrant use of a graph database. Such relationships often span tables in relational databases, causing computationally expensive joins for these types of queries. At the same time, the same data may be better represented in a relational database in use cases in which the attributes of the entity will be more frequently the subject of queries. In many cases, these types of databases are used together in the same system, and none of this should be construed as a disclaimer of relational database related applications, systems that use joins across tables, or an assertion that non-relational databases are inconsistent with use of SQL in all cases.

Another advantage of many noSQL databases is that, relative to relational databases, many noSQL databases, like graph databases, tend to be relatively flexible. In many cases, other types of databases, like many relational databases, operate according to predefined tables and fields, which can be relatively time-consuming and disruptive to modify in complex systems. In contrast, graph databases are often relatively extensible and can accommodate new relationships, types of entities, data types, and parameters of those relationships and entities with little additional effort. Thus, graph databases often find use when data models are fluid or heterogeneous.

SUMMARY

The following is a non-exhaustive listing of some aspects of the present techniques. These and other aspects are described in the following disclosure.

Some aspects include a process of validating data to be stored in a graph database, the process including: obtaining a first node to be stored in a graph database, the first node having a relationship to a second node in the graph database, the relationship corresponding to an edge to be added to the graph database; obtaining a node type of the first node, the node type being one of a plurality of node types of nodes in the graph database, each node type having a respective node-type schema specifying respective criteria to qualify as a valid node of the respective node type; forming, with one or more processors, from a plurality of schemas, a polymorphic schema specifying criteria to qualify as a valid instance of a node type of the first node, wherein forming a polymorphic schema comprises: accessing a first-node-type schema in memory corresponding to the node type of the first node, the first-node-type schema specifying a first criterion to determine whether the first node qualifies as a valid instance of the node type of the first node, determining that the first-node-type schema references a first referenced-schema, the first referenced-schema specifying a second criterion to determine whether the first node qualifies as a valid instance of the node type of the first node, and combining the first-node-type schema with the first referenced-schema in the polymorphic schema by determining whether the first criterion replaces or augments the second criterion; validating, with one or more processors, the first node with the polymorphic schema by determining that the first criterion is satisfied by the first node; and in response to validating the first node, storing the first node and the edge in the graph database.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
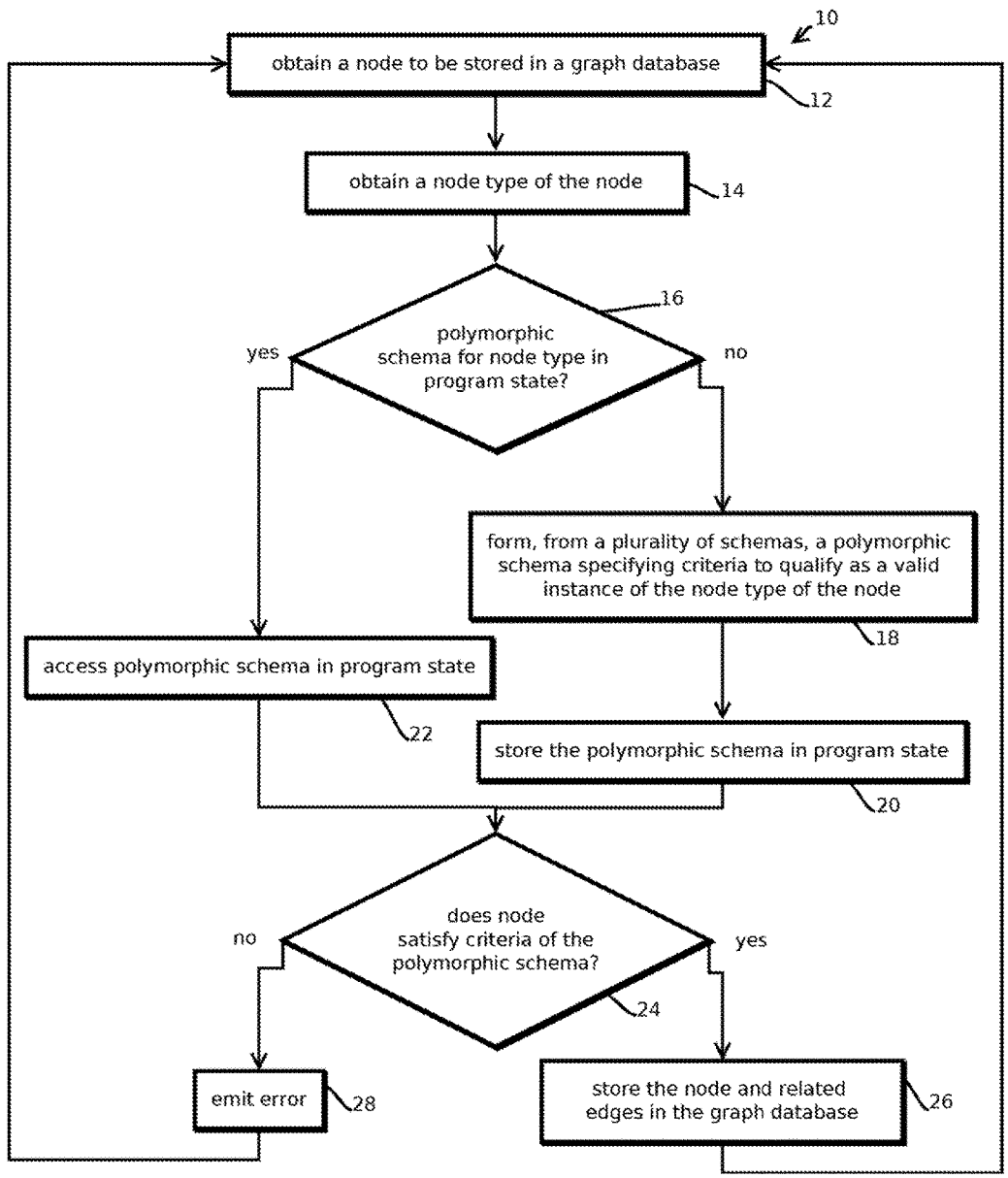
FIG. 1 is a flow chart of an example of a process to validate data with polymorphic schemas in accordance with some embodiments of the present techniques.

While the disclosed techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the disclosed techniques to the particular form disclosed, but to the contrary, the intention is to cover all modifications, equivalents, and alternatives falling within the spirit and scope of the present disclosed techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science. Indeed, the inventors wish to emphasize the difficulty of recognizing those problems that are nascent and will become much more apparent in the future should trends in the distributed workload platform field continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As noted, graph databases are often favored where relationships between data are relatively often implicated in database access requests and when flexibility of the data model is relatively desirable. One consequence of graph database's (and many other noSQL databases') flexibility, however, is that graph databases often do not explicitly impose constraints on the data model, like those often presented by an arrangement of fields and tables in a relational database and associated data specifying data type.

Several distinct problems related to noSQL databases, like graph databases, are mitigated by embodiments of various independently useful techniques described below. The above-noted absence of constraints in graph databases can make it difficult to validate incoming data. Further, the absence of consistent structure can make it difficult to design an application program interface by which the data is exposed to other computers and applications. Challenges with data validation are addressed below with reference to FIGS. 1 and 2, and challenges with API design are addressed below with reference to FIG. 3. The techniques by which these challenges are mitigated are particularly well suited for certain types of distributed systems, which are exemplified by systems like those described with reference to FIG. 4. In many cases, these techniques may be implemented with a networked arrangement of computers, like those described below with reference to FIG. 5.

Data validation generally includes operations like checking whether required fields are present in data submitted for a write to a database, checking whether submitted values fall within minimum and maximum acceptable thresholds, checking whether values are of the appropriate type (e.g., string, integer, long, Boolean, etc.), and checking whether information is encoded in an acceptable format (e.g., ASCII, UTF-8, date formats, address formats, phone-number formats, and the like). One benefit of validation is that other software that accesses the database can be written with confidence that data returned by the database will have passed the validation criteria, simplifying other code in the system by offloading the need for that code to separately validate the data every time the data is retrieved from the database.

Existing techniques for validating data are not well-suited for relatively complex graph databases. Often, systems specify validation criteria in schemas for a data model embodied by the database, and many systems check whether data to be added to the database is in accordance with the corresponding schema. Some graph databases (and other noSQL systems), however, leverage the flexibility of graph databases relatively extensively, giving rise to a particularly diverse and complex data model, and the resulting variety in criteria for valid database entries can become excessively complex and unmanageable with existing techniques for validating data in more traditional use cases.

Some embodiments organize schemas for a graph database (or other noSQL databases) within a set of hierarchical documents, like JavaScript™ object notation (JSON) documents. In some embodiments, the documents define polymorphic schemas with inheritance. For instance, a base schema may be declared, and then, aspects of that base schema may be modified by a more specific variant. In operation, in some embodiments, the schemas validate data ingested by a graph database, but the techniques are also useful in other noSQL databases, like document-oriented databases, key-value stores, and the like.

FIG. 1 shows an example of a process 10 to determine whether data to be stored in a graph database is a valid entry according to a schema corresponding to the type of information represented by the data. The process 10, and the other processes and functionality described herein, may be embodied by program code stored in a tangible, non-transitory, machine-readable medium (like random access memory, hard disk drives, solid-state drives, and the like, which may be within a single computer, or in some embodiments, different portions of the program code may be stored in different media in different computing devices that operate cooperatively in a distributed application, a scenario which also falls within the scope of the singular "medium" as used herein). The operations may be performed in a different sequence than is illustrated, operations may be omitted, additional operations may be added, some operations may be performed concurrently, in some cases in multiple instances, and some operations may be performed serially, none of which is to suggest that any other feature described herein is not also amenable to variation. This is also true of the other processes and functionality described herein.

In some embodiments, the process 10 begins with obtaining a node to be stored in a graph database, as indicated by block 12. The node may be a node in a tree graph that has a parent node, or the node may be a node in other, non-hierarchical graphs having a plurality of connected nodes. Relationships between nodes are also referred to as edges or links. Obtaining a node may include obtaining an entry to be added to the graph database in the form of an application program interface response, for instance, from a third party software-as-a-service (SaaS) application, like those described below with reference to FIG. 4. Or obtaining a node may include obtaining information to be added to a third-party SaaS application via an application program interface, for instance, in accordance with the examples described below with reference to FIG. 4.

In some embodiments, obtaining the node may include receiving a record encoded in a hierarchical serialized data format, like JSON or extensible markup language (XML). In some cases, the record may be obtained via a protocol buffer.

In some cases, the record may indicate a plurality of parameters of the node, such as an identifier of the node and parameters other than an identifier of the node. For example, the node may represent an account to be added to a SaaS application and obtained with the techniques described below with reference to FIG. 4. In this example, parameters of the node may include a user name of the account, an email address associated with the account, a password of the account, contact information of the user associated with the account (like a phone number, a mailing address, or an email address), permissions associated with the account (like a whitelist or blacklists of subsets of data hosted by the SaaS application to which the account holder has access, or functionality of the SaaS application that is enabled or disabled for the respective user). The node may be an update to an existing node within the graph database or the node may be a new node that is not yet stored in the graph database.

In some cases, the node may have a relationship to another node that is already in the graph database. This relationship may correspond to an edge to be added to the graph database along with the node, the edge linking the node and the other node. In some cases, the edge may be a directed edge, such as one indicating that the node has a child relationship with a parent node, or that a node has some relationship, like possession, in which a verb representing the relationship acts upon the node to which the edge is directed. In some embodiments, the node may have a plurality of relationships to a plurality of other nodes in the graph database, the plurality of relationships corresponding to a plurality of edges to be added to the graph database. In some cases, the edges may be weighted edges, with values indicating a strength of the relationship.

In some cases, the edges may have parameters indicating attributes of the relationship. For example, the example account node serving as a node described above may have a relationship to an application node in the graph database representing the SaaS application hosting the account, in some cases with a graph database having a plurality of such application nodes corresponding to a plurality of different SaaS applications each having accounts. In this example, the node may also have a relationship with a user node in the graph database representing the user having the account, and that user node may share edges with a plurality of different accounts held by that user.

Some embodiments include obtaining a node type of the node, as indicated by block 14. In some embodiments, the graph database may include nodes of a relatively diverse set of types. Each node type corresponds to a different set of validation criteria, for instance, in a different schema. In some embodiments, the graph database may include more than 20 node types, for instance, more than 200 or more than 500 different node types, in many commercially relevant use cases. In some cases, obtaining the node type may be performed by parsing a node type from a command sent to a module performing the process 10 instructing that module to store the node, like a command to "store JSON document X as an account node," or as a user node, or as an application node, or the like. In other embodiments, the node type may be obtained by extracting the node type or inferring the node type from the data that encodes the node. For instance, such data may explicitly reference a validation schema corresponding to the node type.

Next, some embodiments may determine whether a polymorphic schema for the obtained node type is already stored in program state, as indicated by block 16. Polymorphic schemas, as described below, may be formed by combining a plurality of different schemas with a variety of different techniques, including inheritance and composition. In some cases, such a polymorphic schema may have already been formed in an earlier instance of the process 10, and that polymorphic schema may be retained in program state, for instance, in a portion of random access memory allocated to a thread executing at least part of the process 10 by an operating system, to expedite subsequent validation operations on nodes of the same type by avoiding the need to reform the polymorphic schema.

Upon determining that the polymorphic schema for the node type is not in program state, in response, some embodiments may proceed to block 18 and a form, from a plurality of schemas, a polymorphic schema specifying criteria to qualify as a valid instance of the node type of the node, as indicated by block 18. In some embodiments, this operation may include performing the process described below with reference to FIG. 2. In some embodiments, a schema corresponding to the node type of the node may reference one or more other schemas and indicate a type of reference that specifies how the schemas are to be combined. For instance, a schema may indicate that it is a type of another schema, that it extends another schema, that it implements another schema, that it incorporates another schema, or the like. In some cases, the plurality of schemas may be arranged in a hierarchical arrangement of schemas, like in a schema tree, with a base schema specifying criteria shared by all node types (e.g., included unless overwritten), or criteria from which node types may select, and various layers of schemas that modify (e.g., add to, overwrite, delete, extend, and the like) higher layers of schema of the schemas. Or in some cases, the schemas are arranged non-hierarchically, and schemas may reference other schemas that they incorporate, for instance in an acyclic call graph.

Next, some embodiments may store the polymorphic schema in program state, as indicated by block 20. This may include storing the polymorphic schema as an attribute of an object in an object-oriented programming environment. Or some embodiments may commit the polymorphic schema to persistent storage, for instance, in such storage outside program state. Storing the polymorphic schema in program state is expected to facilitate relatively fast retrieval of the polymorphic schema and facilitate modification to the schemas from which the polymorphic schema is formed between routines performing the process 10, as persistent instances need not be identified and expired or updated. Or some embodiments may use persistent storage to expedite subsequent instances in which such a routine is performed. In some cases, the polymorphic schema may have an identifier by which the polymorphic schema may be determined to be expired in virtue of changes to a schema from which the polymorphic schema is formed. In some embodiments, each such schema may include a schema name and version, and the schema names and versions may be input to a hash function that outputs a hash value that serves as the identifier of the polymorphic schema. Incrementing a version of a constituent schema may cause the hash value to change, indicating that any persistently stored versions of the schema are expired.

As noted, in some cases, the polymorphic schema may already be stored in program state before the instance at issue of the process 10 is executed, in which case, some embodiments may access the polymorphic schema in program state as indicated by block 22. Maintaining the polymorphic schema in program state once formed, for instance, during an iteration of an update to the database, like during a daily or hourly batch process, is expected to expedite the process 10 by avoiding the need to reform the polymorphic schema. That said, not all embodiments provide this benefit, as various engineering and cost trade-offs are envisioned, which is not to suggest that any other feature described herein is not also optional.

Next, some embodiments may determine whether the node satisfies criteria of the polymorphic schema, as indicated by block 24. In some embodiments, the polymorphic schema may include a plurality of criteria for determining whether nodes or other data entries are valid. In some cases, as noted above, such entries may include a plurality of different fields of information, and the polymorphic schema may include criteria pertaining to some or all of those fields and indicating acceptable values. In some cases, a criterion on may require that a particular field have a value, regardless of what that value is, for instance, by indicating that a field is required. In some cases, a criterion may indicate that a particular field is optional. In some cases, a criterion may indicate that a value for a field must be greater than a minimum or less than a maximum. In some cases, a criterion may indicate that a particular field must be of a particular type, like an integer, long, string, date, time, array, dictionary, and the like. In some cases, a criterion may indicate that a particular field must include more than a threshold number of values or less than a threshold number of values. In some cases, a criterion may indicate that a particular field must have a particular format, for instance, a particular date, address, telephone number, email address, or the like format. In some cases, formatting requirements may be expressed as a regular expression that evaluates to a value of true in response to determining that the field matches the regular expression. In some cases, the criterion may be conditional upon other fields. For instance, a criterion may indicate that if a field for a user is present, then a field for an email address of that user is required (and that if the user is not present, then no email address is required). In some cases, the polymorphic schema may be expressed as a document, like a serialized data format document, such as JSON or XML, formed by combining relevant portions of the plurality of schemas in block 18. In some cases, the polymorphic schema may include a list of criteria, dictionaries of lists of criteria, dictionaries of criteria, and lists of dictionaries of criteria, for instance, through multiple levels of a hierarchy of nested lists and dictionaries. In some embodiments, a given node may include multiple fields, for instance, five or more fields, and each field may include multiple criteria in the polymorphic schema. In some embodiments, regular expressions may be designated as indicating acceptable values when they evaluate to true or false, depending on the use case and implementation, for instance, indicating that a field has an appropriate format or does not have an unacceptable format. Or in some embodiments, regular expressions may be designated as indicating unacceptable values, for instance, when used to detect executable program code at risk of affecting system security, like regular expressions identifying operators of a SQL statement in a SQL injection attack.

Upon determining that the node does not satisfy the polymorphic schema, i.e., that the child that is not a valid entry in the graph database of the type of the node, some embodiments may proceed to block 28 and emit (e.g., log or throw) a validation error. In some embodiments, the error may be thrown by a routine executing the process 10, and the error may include a message indicating the type of the error, for instance, a validation error, and an indication of the criteria that the node fail to satisfy. For instance, the error may include a list of failed criteria. Errors may be logged for later troubleshooting and, in some cases, handled by an error handling routine that implements logic to potentially address the validation error at issue.

Alternatively, upon determining that the node does satisfy the criteria of the polymorphic schema, some embodiments may proceed to block 26 and store the node and related edges in the graph database. In some embodiments, the node may be stored first, and then edges may be stored after storing the node. In some cases, storing edges may include executing queries upon the graph database to identify responsive nodes that edges will link to the node.

The process 10 may return to block 12 to repeat another iteration. In some embodiments, the process 10 may be performed through multiple iterations as a collection of data is ingested into the graph database, for instance, during a batch process to update the graph database to reflect a collection of changes. In some embodiments, these iterations may be performed concurrently, for instance, on multiple computing devices, or some embodiments may perform multiple iterations of the process 10 on a single computing device, and a single thread, consecutively.

Figure 2:
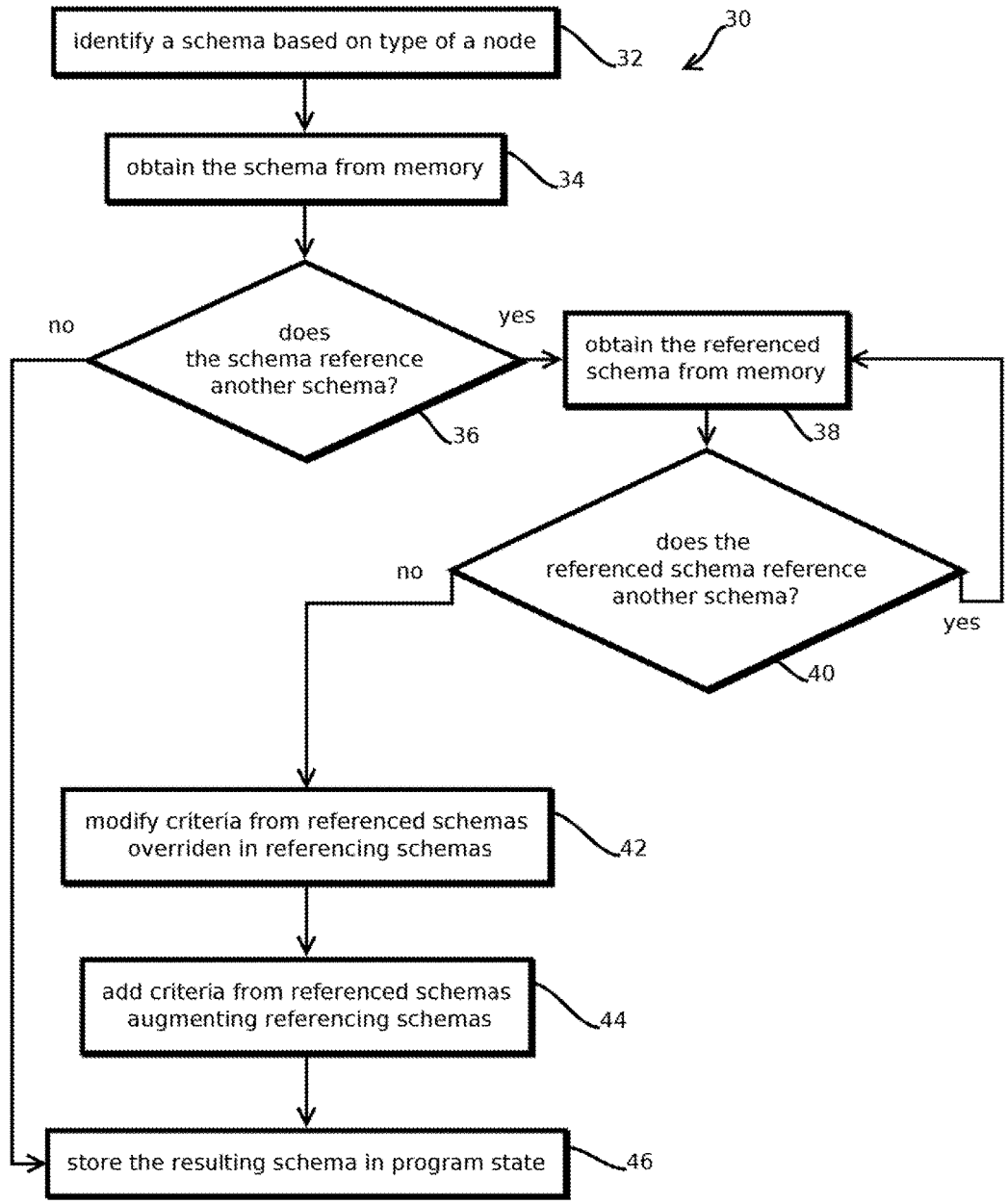
FIG. 2 is a flow chart of an example of a process to form a polymorphic schema in accordance with some embodiments of the present techniques.

FIG. 2 shows an example of a process 30 to form a polymorphic schema from a plurality of schemas. In some embodiments, the process 30 may be performed in the course of executing block 18 of FIG. 1, but embodiments of process 30 are not limited to that implementation, or vice versa, which is not to suggest that any other embodiment is limited to the examples described. In some embodiments, the process 30 includes identifying a schema based on a type of node, as indicated by block 32. In some embodiments, a system executing the process 30 may include a relatively large collection of schemas for a relatively large collection of node types. Each node type may correspond to a distinct schema. In some cases, these node type schemas may reference the above-noted plurality of schemas that are combined together to form the polymorphic schema, or a subset thereof, like in a linked list. Some embodiments may include more than 20, more than 200, or more than 2,000 different types of schemas specific to respective types of nodes, edges, or other database entities, like a node or edge parameter. In some cases, the type of node is specified by a command obtained in block 12 of FIG. 1 to the process 10 to store a node.

In some embodiments, as noted above, the number of schemas may be relatively large, and the arrangement of schemas may be relatively complex. To manage this complexity at commercially relevant scales, some embodiments may store the schemas in a noSQL (no structured query language) document oriented database, for example in a MongoDB™ database. In some embodiments, each schema may correspond to a document in the database, and the documents may be stored in a hierarchical serialized data format, like JSON or XML. In some cases, the database may be devoid of many of the constraints imposed by relational databases to facilitate the type of flexibility described above, though embodiments are also consistent with use of relational databases. In some cases, the database may maintain replicas of the documents, for instance, on different computing devices, and the database may implement horizontal sharding for purposes of load-balancing. In some cases, the documents may be stored in a grid file system that appear as a single disc to an accessing computer while replicating data in redundant storage arrays in multiple locations.

Next, some embodiments may obtain the schema from memory, as indicated by block 34. In some cases, this operation may include querying the document database for a schema corresponding to the type of node at issue. In some cases, the schema is returned in the hierarchical serialized data format from the database, and some embodiments may parse the schema to transform the text into an arrangement of lists and dictionaries or hierarchy of objects and attributes in program state.

Next, some embodiments may determine whether the schema references another schema, as indicated by block 36. In some cases, this may include interrogating a designated portion of the list or dictionaries parsed and held in program state, for instance, for dictionary keys using reserve terms, like "imports", "extends," "implements," "overrides," and the like. In some cases, these terms may indicate a relationship between the previously obtained schema and the referenced schema, for instance, how the two schemas are to be combined. Examples of these relationships are described below. In some cases, these reserve terms may be paired with an identifier of the referenced schema in the document database. In some cases, the schema may reference a plurality of other schemas, and each of those plurality of schemas may be advanced to the next step.

Upon determining that the schema references another schema, some embodiments may obtain the reference schema from memory, as indicated by block 38. This may include querying the above-described document database for schemas having identifiers listed in the reference. The obtained schemas may be obtained in the format described above and processed to load the schemas in program state with the techniques described above.

Next, some embodiments may determine whether the referenced schema references another schema, as indicated by block 40. This operation may be performed on each of the obtained referenced schemas. This operation may include the techniques described above with reference to block 36. Upon determining that the referenced schema contains in itself a reference to another schema, some embodiments may return to block 38 and obtain that referenced schema from memory, using the techniques described above. In some embodiments, blocks 38 and 40 may be performed by a recursive function that takes as a parameter an identifier of a referenced schema, obtains that referenced schema, and parses that reference schema to identify references to other schemas, at which point the recursive function may call itself listing those identified schemas as parameters. Thus, this recursive function, in some embodiments, may process and obtained an arbitrary large number of referenced schemas in a chain (e.g., through a hierarchy) of referenced schemas, thereby accommodating relatively complex arrangements of schemas that may be combined in a polymorphic schema. Or some embodiments may implement this technique non-recursively, for instance, by limiting the number of references to a fixed amount to manage complexity.

Upon determining that each referenced schema does not reference another schema (beyond those already processed), some embodiments may proceed to block 42. In some embodiments, the referenced schemas may ultimately link back to a base schema that contains criteria accessible to, and in some cases shared by, every node type schema.

In block 42, some embodiments may modify criteria from referenced schemas overridden in referencing schemas. As noted above, in some cases, a reference to a schema may include a reserved term indicating the type of reference, and one example may include an overriding type. Overriding may include inheriting the criteria from the referenced schema while overwriting any criteria in the reference schema that are also expressed in the referencing schema. For instance, if the referenced schema indicates that an email address field is required, and the referencing schema indicates that an email address is optional, the overriding relationship may cause the email address field to be designated as optional in the polymorphic schema.

Next, some embodiments may add criteria from referenced schemas augmenting referencing schemas, as indicated by block 44. In some embodiments, schemas may be incorporated into one another through composition, rather than through inheritance. In some embodiments, the reference may include an indication of this relationship, for instance, with a reserved term like "import." In some cases, adding criteria may include merging hierarchical arrangements of lists and dictionaries, for instance, by identifying dictionary keys present in both a referencing and referenced schema and combining, for instance, appending, corresponding values of those dictionary keys into lists. Some embodiments store the resulting schema in program state (e.g., in persistent or dynamic memory accessible to the program), as indicated by block 46.

By way of illustrative example, the following two schemas may be merged in some embodiments. A "accountSaaSCo.json" schema, corresponding to a fictitious example SaaS application provider named SaaSCo may be declared as extending an "accounts.json" schema. In this example, the indicated merging signifies that the nodes/properties declared in the "properties" section of the schema are added to the accounts schema, thereby adding new properties or redefining existing ones:

Example "accountSaaSCo.json" schema

```
{
  "schema" : {
  "id" : "accountSaaSCo",
  "type" : "object",
  "@extends" : [ "#accounts" ],
  "properties" : {
    "ipWhitelisted" : {
      "title" : "IP Whitelisted",
      "type" : "boolean",
      "ruled" : true,
      "hidden" : true
    },
    "aliases" : {
      "title" : "Aliases",
      "type" : "array",
      "items" : {
        "type" : "string"
      },
      "hidden" : true
    },
    "givenName" : {
      "title" : "Given Name",
      "type" : "string",
      "source" : "person"
    },
    "familyName" : {
      "title" : "Family Name",
      "type" : "string",
      "source" : "person"
    },
    "nonEditableAliases" : {
      "title" : "Non-editable Aliases",
      "type" : "array",
      "items" : {
        "type" : "string"
      },
      "hidden" : true
    },
    "isAdmin" : {
      "title" : "Is Admin",
      "type" : "boolean"
    },
    "isDelegatedAdmin" : {
      "title" : "Is Delegated Admin",
      "type" : "boolean"
    },
    "isMailboxSetup" : {
      "title" : "Is Mailbox Setup",
      "type" : "boolean",
      "hidden" : true
    },
    "orgunit" : {
      "title" : "Organization Unit",
      "type" : "object",
      "@ref" : "#orgunitSaaSCo",
      "ruled" : true,
      "properties" : {
        "syncStatus" : {
          "title" : "Sync Status",
          "type" : "string"
        }
      },
```

```
        "values" : {
          "type" : "entity",
          "root" : "application",
          "attribute" : "orgunits"
        },
        "@mapping" : "department#persons"
      },
      "groups" : {
        "title" : "Groups",
        "type" : "array",
        "items" : {
          "type" : "object",
          "@ref" : "#groupSaaSCo",
          "properties" : {
            "syncStatus" : {
              "title" : "Sync Status",
              "type" : "string"
            }
          }
        },
        "ruled" : true,
        "values" : {
          "type" : "entity",
          "root" : "application",
          "attribute" : "groups"
        }
      }
    },
    "required" : [ "givenName", "familyName" ]
  }
}
```

Example "accounts.json" schema

```
{
  "schema" : {
    "id" : "accounts",
    "type" : "object",
    "idAssignable" : true,
    "@extends" : [ "#targetEntities" ],
    "properties" : {
      "request" : {
        "title" : "Transaction Request",
        "type" : "string",
        "maxLength" : 50,
        "pattern" : "^[^:=<>(){ }\\[\\]]*$",
        "hidden" : true
      },
      "username" : {
        "title" : "Username",
        "type" : "string",
        "maxLength" : 50,
        "pattern" : "^[^:=<>(){ }\\[\\]\\s]+$",
        "source" : "person"
      },
      "password" : {
        "title" : "Password",
        "type" : "string",
        "maxLength" : 50,
        "pattern" : "^[^:=<>(){ }\\[\\]]*$",
        "source" : "person",
        "hidden" : true
      },
      "email" : {
        "title" : "Email",
        "type" : "string",
        "maxLength" : 50,
        "pattern" : "^[A-Z0-9a-z._%-]+@[A-Za-z0-9.-]+\\.[A-Za-z]{2,6}$",
        "source" : "person"
      },
      "owner" : {
        "type" : "object",
        "title" : "Account Owner",
        "@in" : "accounts#persons",
        "hidden" : true
      },
      "groups" : {
        "title" : "Groups",
        "type" : "array",
        "items" : {
          "type" : "object",
          "@ref" : "#groups"
        }
      },
      "application" : {
        "type" : "object",
        "title" : "Application",
        "@in" : "accounts#applications",
        "hidden" : true
      },
      "rules" : {
        "type" : "array",
        "title" : "Rules",
        "items" : {
          "type" : "string"
        }
      },
      "source" : {
        "type" : "string",
        "maxLength" : 50,
        "pattern" : "^[^:=<>(){ }\\[\\]]*$",
        "title" : "Source"
      },
      "transactionID" : {
        "title" : "Transaction ID",
        "type" : "string",
        "maxLength" : 50,
        "pattern" : "^[^:=<>(){ }\\[\\]]*$",
        "hidden" : true
      },
      "transactionTS" : {
        "title" : "Transaction Timestamp",
        "type" : "string",
        "maxLength" : 50,
        "pattern" : "^[^:=<>(){ }\\[\\]]*$",
        "hidden" : true
      },
      "service" : {
        "title" : "Service Account",
        "type" : "boolean",
        "hidden" : true
      }
    },
    "required" : [ "username" ]
  }
}
```

In some embodiments, blocks 42 and 44 may be performed in the recursive operations described above with reference to blocks 38 and 40, or some embodiments may perform these operations after gathering an entire set of referenced schemas along a chain or hierarchy (which is not to imply that a hierarchy may not form a chain, or than any other list of items describe mutually exclusive categories of list items). Combining referenced schemas may yield a polymorphic schema, that is a schema that is a combination of multiple schemas through either inheritance or composition relationships between those schemas.

One advantage of polymorphism is expected to be that relatively complex arrangements of schemas can be managed. For instance, some criteria may be shared by a subset of node types, like a format for a telephone number, and each of those node type schemas may reference another schema that contains the criteria for a proper telephone number format to be valid. As a result, the criteria for the telephone number format need not be replicated in the document repository (or other repository of schemas) every time the criteria is used, and changing the criteria can be accomplished by changing a single value. Such arrangements are expected to make it easier for developers to reason about the schemas and maintain the schemas as features are added, removed, or adjusted in a program using the validation routine of process 10 described above. Being able to manage this complexity is expected to facilitate use of the flexibility afforded by graph databases relative to relational databases while also providing the benefits of data validation often provided by relational databases. That said, embodiments are not limited to systems that provide these benefits, as various engineering and cost tradeoffs are envisioned, and multiple techniques that are independently useful are described herein, and some embodiments may implement some of those techniques without implement the others.

As noted, traditionally, the flexibility afforded by graph databases has presented trade-offs in other aspects of system architecture. For example, many computer systems expose and use application program interfaces (APIs) by which data within the systems is accessed and functionality within the systems is made available to other systems. In many cases, these APIs are implicitly or explicitly structured around the underlying data model of the system holding data upon which the application program interface operates. However, in the context of graph databases (and other noSQL databases), which afford relatively flexible and diverse data models, many techniques for forming APIs become expensive and complex to implement. Each time the flexibility of the graph database is used to adjust a data model or add a new data model, in many cases, the API may need to be rewritten to reflect those changes. And even without changes, re-structuring API commands for every variant of a data model in a system can be burdensome and unmanageable for developers. As a result, in many cases, software architects decline to take advantage of the flexibility afforded by graph databases, use other types of databases, or incur the complexity and cost associated with frequent API revisions.

Some embodiments expand the notion of an API to create a dynamic API that adapts to a context of an API request to access differing context-specific data models specified by context-specific schemas. In many cases, the schemas can become relatively numerous and complex, particularly when a large number of different contexts are accommodated by the system. Accordingly, some embodiments may leverage the techniques described herein to implement polymorphic schemas by which schema criteria are reused across multiple schemas and subsets of the schema criteria are encapsulated in reusable modules that make the schemas easier to reason about and manage for software developers.

These techniques may be used in conjunction with the data validation techniques described herein or the dynamic APIs may be used independently of those techniques, which is not to suggest that any other feature described herein is not also amenable to variation.

Figure 3:
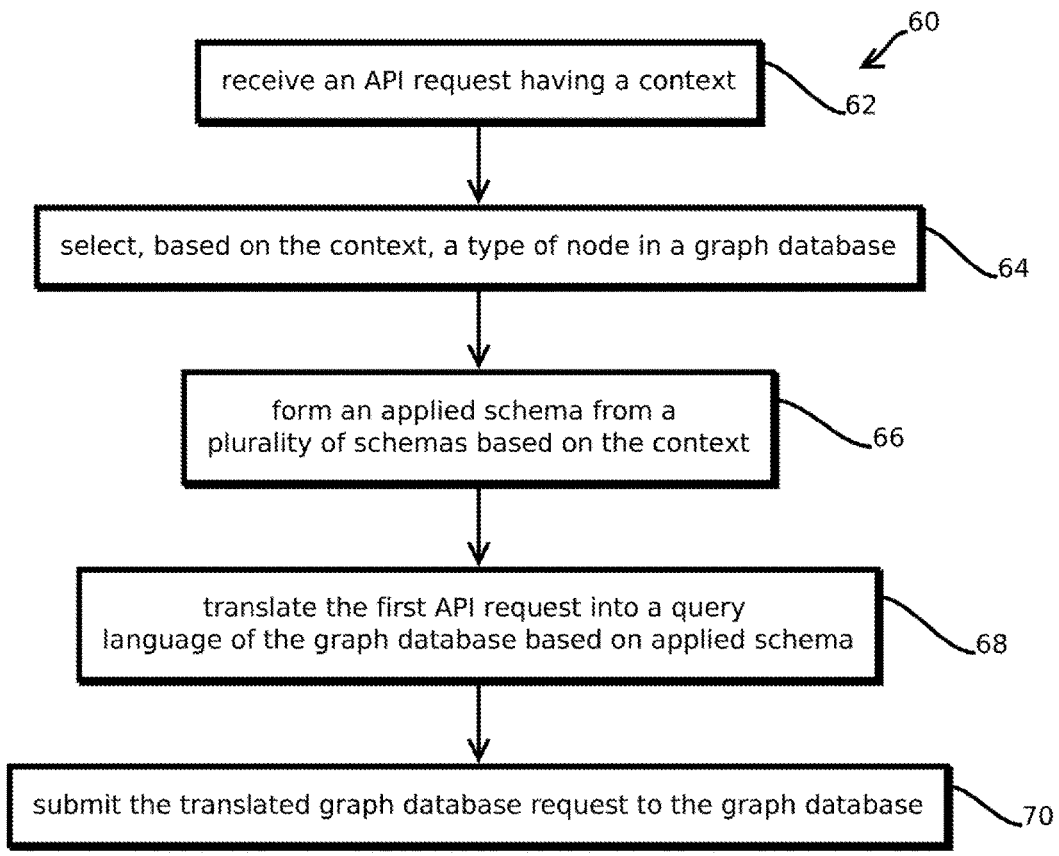
FIG. 3 is a flow chart of an example of a process to service a dynamic application program interface request in accordance with some embodiments of the present techniques.

Some embodiments may execute a process 60 shown in FIG. 3 to process dynamic APIs requests and, thereby, implement a dynamic API. In some embodiments, the process 60 may allow a generic API request to access distinct data models having distinct schemas based on contexts of the API request. For instance, the same operations specified in a plurality of different API requests (like a request to read or write records to a graph database) may implicate differing data schemas having differing fields, types, and relationships with other records. As a result, it is expected that much of the complexity associated with dealing with diverse sets of data schemas that arise in flexible databases, like graph databases, may be abstracted away from developers coding against the API, making the underlying systems more extensible and easier to manage and operate.

Some embodiments may include receiving an API request having a context, as indicated by block 62. In some cases, the API request may be an API request to write a record to the graph databases described herein or a request to read a record from the graph databases described herein. For instance, the API request may be a request to add one or more nodes to a graph database, to add one or more fields to a node in the graph database, or a request to add one or more edges reflecting relationships between nodes in a graph database. In many cases, an individual API request may implicate a collection of these examples, such as a request to write a node having a plurality of fields and a plurality of relationships to other nodes to the graph database. These collections of database entities may vary with different contexts corresponding to different types of data in the database.

In some embodiments, the API request contains an explicitly stated context for the API request. For example, the context may indicate a source of data in parameters (also referred to as fields) of the API request or a destination of data to be retrieved with the API request. In some cases, the source or the destination is an external API of a third-party SaaS application that is remotely hosted and accessed via the external API. Often, third-party systems have diverse, non-standardized representations of data corresponding to API specific data models underlying the systems, and each of those different APIs can give rise to a different context associated with the API request. These sources or destinations may serve as a context.

The context of an API requests is distinct from an operation specified by the API request and parameters of the operation. The same operation may apply to a plurality of different contexts, for instance, an instruction to add a node or read a node from the graph database may apply to each of a plurality of different third-party external APIs from which the data is read or to which the data is being sent (each corresponding to a different context, in some implementations). Similarly, the parameters of the operation may include a plurality of different fields and values for those fields upon which the operations performed. The parameters may vary with the context, but the parameters do not in and of themselves indicate the context. For instance, differing contexts may have the same parameter, like a telephone number or email address for a given field of a given node to be written to the graph database corresponding to a user, but the context may be different and the different sets of parameters may be included or different underlying data models may apply even if the parameters are the same.

In some cases, the context is explicitly labeled as such, or some embodiments may infer the context, for instance, based on a provenance of the data included in an API request. In some embodiments, the API request may be characterized as an internal API request. The API request is internal in the sense that it is distinct from external API requests made to third-party systems over which the entity performing the process 60 has no control and among which, and many cases, the APIs are non-standardized and heterogeneous.

In some embodiments, the context may include multiple aspects. For instance, the context may include both an identifier of a third-party external API and a type of record to be exchanged with that third-party external API. For instance, a context may specify both an application hosted by a third party (like a remotely hosted SaaS application), and a type of data being exchanged, like records pertaining to a user account, records pertaining to a user, records pertaining to contact information, or records pertaining to various other types of hosted information. Thus, a given context of a given API request may specify both one application among a plurality of applications and a type of data exchanged with that application. In some cases, a single application may have a plurality of different contexts associated therewith, each context pertaining to a different type of operation or data. Or in some embodiments, each application may have one and only one context.

For example, in the two example schemas above, accountSaaSCo.json and accounts.json, accounts.json represents an example base account schema and accountSaaSCo.json represents an account of a particular API. The API, depending on context, may respond with information specified in the base schema or the SaaSCo API specific schema, e.g., /accounts/{id} or /SaaSCoAccount/{id}. The response may be different, though for the same entity in the graph database. The behavior of that API is, thus, an example of a polymorphic implementation.

Next, some embodiments may select, based on the context, a type of node in a graph database, as indicated by block 64. In some cases, the type of node may be selected only based on the context, or some embodiments may select the type of node based both on the context and the API request. For instance, a given context may apply to multiple types of nodes, but the API request combined with the context may uniquely specify a type of node among a plurality of different types of node in the graph database. Examples of types of nodes include a node pertaining to a user, a node pertaining to an account of that user in a given application, and node pertaining to the application, and the like. The present technique is described with reference to nodes, but also applies to other entities within a graph database and other types of databases, like an edge, a field, a graph, or combinations thereof. Some embodiments may maintain in memory a mapping between contexts and types of nodes. In some cases, the context may have two parts, as noted, and one part may identify a set of types of nodes, such as a set of types of nodes corresponding to a given application, and another part may identify a subset of those types of nodes, like a subset pertaining to a type of information exchange with an external API, with the API request specifying an individual type of node among that subset.

Next, some embodiments may form an applied schema from a plurality of schemas based on the context, as indicated by block 66. In some embodiments, the applied schema may be a polymorphic schema, like those described above. In some embodiments, the process of FIG. 2 may be executed to form the applied schema. For instance, the type of node identified in block 64 may uniquely identify a schema corresponding to that type of node, and that schema may reference another schema and indicate a relationship therebetween like one schema overriding the other, one schema extending the other, one schema implementing the other, one schema including the other, or the like. As noted above, polymorphic schemas are expected to be relatively manageable when relatively diverse sets of data models are implemented in a graph database. Applied schemas are not limited to polymorphic schemas and may include other arrangements, which is not to suggest that any other feature is limited to the examples described.

Next, some embodiments may translate the first API request into a query language of the graph database based on the applied schema, as indicated by block 68. This step may include selecting a subset of the applied schema pertaining to an operation of the API request based on tokens included in the API request. Some embodiments may include determining constituent components of the data model of the graph database corresponding to the context described by the selected subset of the applied schema, for instance, a schema description of a node specifying fields of the node and edges of the node. In some embodiments, the criteria may be associated with mappings between parameters of the API request and fields of the applied schema present in the graph database. For instance, the applied schema may indicate that a parameter corresponding to an email address field maps to a user email_field of a node corresponding to a user account.

Translating the API request may include forming a query language command having a plurality of portions. In some embodiments, one portion may select entities within the graph database and another portion may specify operations to be performed upon those entities. Some embodiments may parse from the API request an identifier by which a given node or edge or other entity in the graph database is matched and form a portion of the query language command specifying that the graph database is to match the identifier to responsive nodes, thereby indicating which nodes are implicated by the query language command. In some embodiments, translating the API request may also include forming a second portion of the query language command that instructs the graph database to create a new field, edge, node, or other entity in the graph database with a value specified by the second portion.

Some embodiments may append the first portion to the second portion and submit the translated graph database request to the graph database, as indicated by block 70. In some cases, this may include submitting one or more queries or query language commands to the graph database. In some embodiments, the graph database is a Neo4j graph database and the query language is cypher, though embodiments are consistent with a variety of other different types of databases in a variety of other different types of three languages. For instance, some embodiments may implement the present techniques in a relational database, and SQL may serve as the query language.

In some embodiments, forming the second portion of the query language request may include separately obtaining a field or other entity and a value for that field or other entity. In some cases, the field or other entity may be obtained either from the applied schema or the API request. In some cases, the value for the field or other entity may be obtained from the API request itself, such as from a parameter of the API request.

In some cases, the command is a request to write to the database, and some embodiments may write the specified values to the database. In some cases, the request is a request to read from the database, and some embodiments may encode responsive values as an API response sent to a requesting computing device that submitted the API request.

Figure 4:
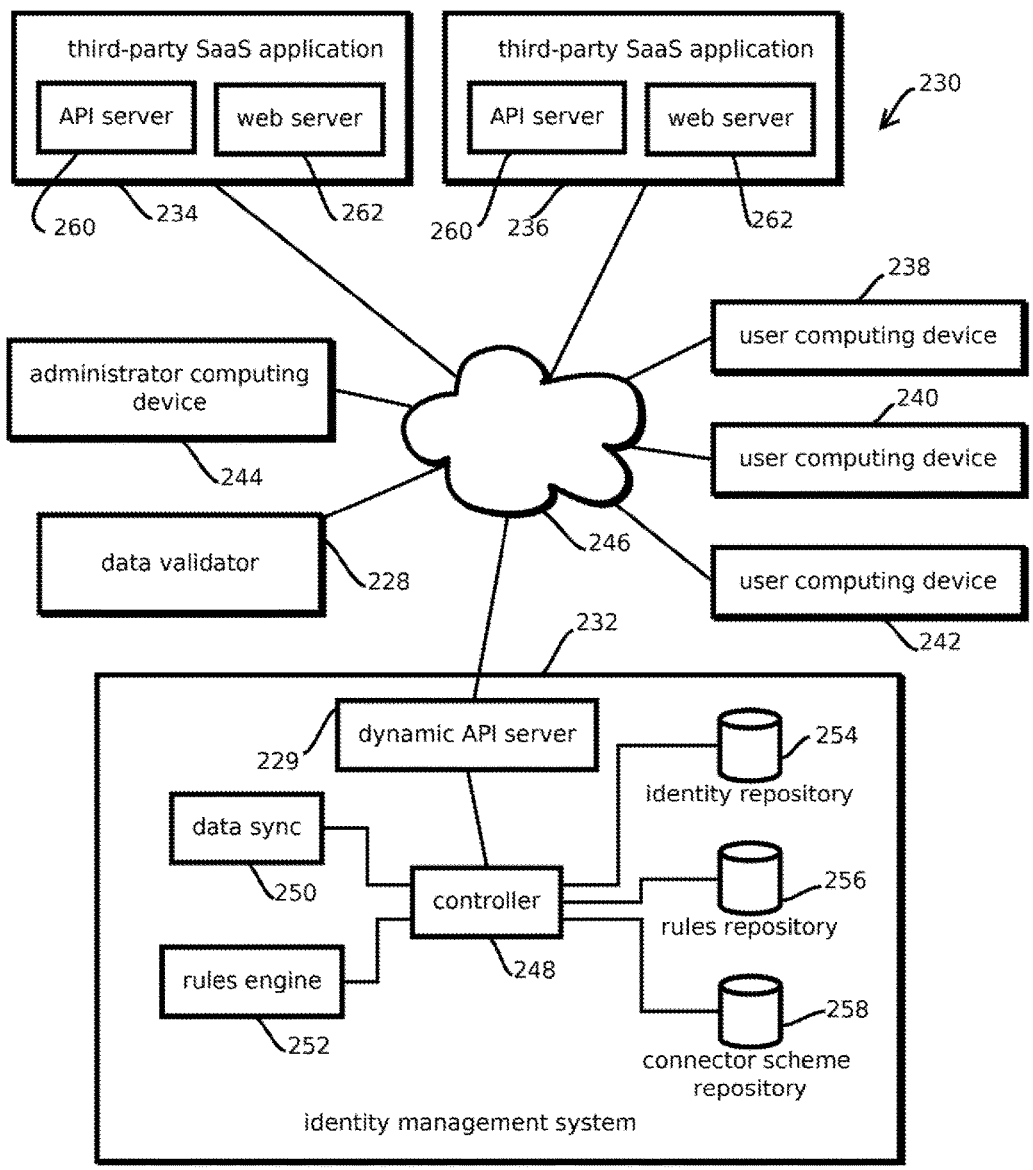
FIG. 4 is a block diagram of a physical and logical architecture of an example of an identity management system that exemplifies the types of applications that may benefit from the techniques of FIGS. 1 through 3.

FIG. 4 is a block diagram of a computing environment 230 in which the above-describe techniques may be implemented, though it should be emphasized that this is one example of a variety of different systems that are expected benefit from the presently described techniques.

As enterprises move their applications to the cloud, and in particular to SaaS applications provided by third parties, it can become very burdensome and complex to manage roles and permissions of employees. For example, a given business may have 20 different subscriptions to 20 different SaaS offerings (like web-based email, customer resource management systems, enterprise resource planning systems, document management systems, and the like). And that business may have 50,000 employees with varying responsibilities in the organization, with employees coming and going and changing roles regularly. Generally, the business would seek to tightly control which employees can access which SaaS services, and often which features of those services each employee can access. For instance, a manager may have permission to add or delete a defect-tracking ticket, while a lower-level employee may only be allowed to add notes or advance state of the ticket in a workflow. Or certain employees may have elevated access to certain email accounts or sensitive human resources related documents. Each time an employee arrives, leaves, or changes roles, different sets of SaaS user accounts may need to be added, deleted, or updated. Thus, many businesses are facing a crisis of complexity, as they attempt to manage roles in permissions across a relatively large organization using a relatively large number of SaaS services with relatively fine-grained feature-access controls.

These issues may be mitigated by some embodiments of the computing environment 230, which includes an identity management system 232 that manages roles and permissions on a plurality of different third-party SaaS applications 234 and 236. In some cases, the SaaS applications may be accessed by users having accounts and various roles, subject to various permissions, on user computing devices 238, 240, or 242, and those accounts may be managed by an administrator operating administrator computing device 244. In some cases, the user computing devices and administrator computing device may be computing devices operated by a single entity, such as a single entity within a single local area network or domain. Or in some cases, the user computing devices 238, 240, and 242 may be distributed among a plurality of different local area networks, for instance, within an organization having multiple networks. In the figure, the number of third-party application servers and user computing devices is two and three respectively, but it should be appreciated that commercial use cases are expected to involve substantially more instances of such devices. Expected use cases involve more than 10 third-party SaaS applications, and in many cases more than 20 or 50 third-party SaaS applications or on-premises applications. Similarly, expected use cases involve more than 1,000 user computing devices, and in many cases more than 10,000 or more than 50,000 user computing devices. In some cases, the number of users is expected to scale similarly, in some cases, with users transitioning into new roles at a rate exceeding 10 per day, and in many commercially relevant use cases, exceeding 100 or 1,000 per day on average. Similarly, versioning of third-party APIs and addition or subtraction of third-party APIs is expected to result in new APIs or new versions of APIs being added monthly or more often in some use cases.

In some embodiments, the user computing devices 238, 240, and 242 may be operated by users accessing or seeking access to the third-party SaaS applications, and administrator computing device 244 may be operated by a system administrator that manages that access. In some embodiments, such management may be facilitated with the identity management system 232, which in some cases, may automatically create, delete, or modify user accounts on various subsets or all of the third-party SaaS applications in response to users being added to, removed from, or moved between, roles in an organization. In some embodiments, each role may be mapped to a plurality of account configurations for the third-party SaaS applications. In some embodiments, in response to a user changing roles, the administrator may indicate that change in roles via the administrator computing device 244, in a transmission to the identity management system 232.

In response to this transmission, the identity management system may retrieve from memory and updated set of account configurations for the user in the new role, and records of these new account configurations may be created in a graph database in the identity management system 232. That graph database and the corresponding records may be synchronized with corresponding third-party applications 234 and 236 to implement the new account configurations, for instance, using the techniques described above. Further, in some cases, a new deployment of the identity management system 232 may contain a graph database populated initially by extracting data from the third-party SaaS applications and translating that data into a canonical format suitable for the graph database using the techniques described above. In some embodiments, the third-party SaaS applications may include an API server 260 and a web server 262.

In some embodiments, the computing environment 230 includes a data validator 228 that performs the operations of FIGS. 1 and 2 described above. In some cases, the data validator includes a document database storing the schemas described above, a schema formation module that performs the process 30 of FIG. 2, including a schema crawler that performs blocks 38 to 40 to recursively crawl through a set of linked schemas, and modules that combine criteria from the schemas. In some cases, the data validator 228 may validate data entering the identity repository 254 of the identity management system 232.

In some embodiments, the identity management system 232 may include a dynamic API server 229 that implements the process described above with reference to FIG. 3. In some embodiments, the dynamic API server 229 may receive API requests including a context and construct or otherwise form corresponding query language requests for the identity repository 254 based on the context.

In some embodiments, each of the third-party SaaS applications are at different domains, having different subnetworks, at different geographic locations, and are operated by different entities. In some embodiments, a single entity may operate multiple third-party SaaS applications, for instance, at a shared data center, or in some cases, a different third-party may host the third-party SaaS applications on behalf of multiple other third parties. In some embodiments, the third-party SaaS applications may be geographically and logically remote from the identity management system 232 and each of the computing devices 238, 240, 242, and 244. In some embodiments, these components 232 through 242 may communicate with one another via various networks, including the Internet 246 and various local area networks.

In some embodiments, the identity management system 232 includes a controller 248, a data synchronization module 250, a rules engine 252, and identity repository 254, a rules repository 256, and a connector schema repository 258. In some embodiments, the controller 248 may direct the system 10 described above with reference to FIG. 1, e.g., via the task tree 16, in some cases by communicating with the various other modules of the identity management system and the other components of the computing environment 230. In some embodiments, the data synchronization module 250 may be configured to synchronize records in the identity repository 254 with records in the third-party SaaS applications, for instance by translating those records at the direction of the controller 248, using the system 10 of FIG. 1. For instance, a user may transfer into a sales group at a company, and the rules may indicate that in the new role, the user is be given a SaaS customer-relationship management account, and that account is to be added in the SaaS application to a group corresponding to a geographic sales region. These may lead to sequential tasks, where the account needs to be created via the API, before the API can be commanded to add the account to a group.

In some embodiments, the rules engine 252 may be configured to update the identity repository 254 based on rules in the rules repository 256 to determine third-party SaaS application account configurations based on changes in roles of users, for instance received from the administrator computing device 244, at the direction of controller 248. In some embodiments, the administrator computing device 244 may send a command to transition a user from a first role to a second role, for instance, a command indicating the user has moved from a first-level technical support position to a management position. In response, the controller 248 may retrieve a set of rules (which may also be referred to as a "policy") corresponding to the former position and a set of rules corresponding to the new position from the rules repository 246. In some embodiments, these sets of rules may indicate which SaaS applications should have accounts for the corresponding user/role and configurations of those accounts, like permissions and features to enable or disable. In some embodiments, these rules may be sent to the rules engine 252, which may compare the rules to determine differences from a current state, for instance, configurations to change or accounts to add or remove. In some embodiments, the rules engine 252 may update records in the identity repository 254 to indicate those changes, for instance, removing accounts, changing groups to which users belong, changing permissions, adding accounts, removing users from groups, and the like. In some cases, applying the rules may be an example of unordered tasks performed by the system 10 above. In some embodiments, these updates may be updates to a graph data structure, like the examples described above. In some embodiments, the graph data structure may be a neo4j graph database available from Neo Technology, Inc. of San Mateo, Calif. In some embodiments, the controller 248 may respond to these updates by instructing the data sync module 252 translate the modified nodes and edges into API commands, using a variant of the system 10 of FIG. 1 send those API commands to the corresponding third-party SaaS applications.

In some embodiments, the identity repository 254 may include a graph data structure indicating various entities and relationships between those entities that describe user accounts, user roles within an organization, and the third-party SaaS applications. For instance, some embodiments may record as entities in the graph data structure the third-party SaaS applications, accounts of those applications, groups of user accounts (in some cases in a hierarchical taxonomy), groups of users in an organization (again, in some cases in a hierarchical taxonomy, like an organizational structure), user accounts, and users. Each of these nodes may have a variety of attributes, like the examples described above, e.g., user names for user accounts, user identifiers for users, group names, and group leaders for groups, and the like. In some embodiments, the graph data structure may be a neo4j graph database available from Neo Technology, Inc. of San Mateo, Calif.

In some embodiments, these nodes may be related to one another through various relationships that may be encoded as edges of the graph. For instance, an edge may indicate that a user is a member of a subgroup, and that that subgroup is a member of a group of subgroups. Similarly, and edge may indicate that a user has an account, and the account is a member of a group of accounts, like a distribution list. In some examples, and edge may indicate that an account is with a SaaS application, with the respective edge linking between a node corresponding to the particular account and another node corresponding to the SaaS application. In some embodiments, multiple SaaS applications may be linked by edges to a node corresponding to a given party, such as a third-party.

In some embodiments, this data structure is expected to afford relatively fast operation by computing systems for certain operations expected to be performed relatively frequently by the identity management system 232. For instance, some embodiments may be configured to relatively quickly query all accounts of the user by requesting all edges of the type "has_an_account" connected to the node corresponding to the user, with those edges identifying the nodes corresponding to the respective accounts. In another example, all members of a group may be retrieved relatively quickly by requesting all nodes connected to a node correspond to the group by an edge that indicates membership. Thus, the graph data structure may afford relatively fast operation compared to many traditional systems based on relational databases in which such relationships are evaluated by cumbersome join operations extending across several tables or by maintaining redundant indexes that slow updates. (Though, embodiments are also consistent with use of relational databases instead of graph databases, as multiple, independently useful techniques are described).

Some embodiments of the identity management system implement techniques to translate between heterogenous APIs and a canoncial database, as described in a U.S. patent application No. 15/433,300, titled MAPPING HETEROGENEOUS APPLICATION-PROGRAM INTERFACES TO A DATABASE, filed on the same day as this filing, bearing the contents of which are hereby incorporated by reference.

Some embodiments of the identity management system may implement techniques to designate sets of tasks as sequential and execute them in sequence, while executing other tasks concurrently, as described in a U.S. patent application No. 15/433,335, titled DISTRIBUTED PROCESSING OF MIXED SERIAL AND CONCURRENT WORKLOADS, filed on the same day as this filing, bearing the contents of which are hereby incorporated by reference.

Some embodiments of the identity management system may implement techniques to process a dynamic API request that accommodates different contexts of different requests corresponding to different graph database schemas, as described in a U.S. patent application No. 15/433,425, titled EXPOSING DATABASES VIA APPLICATION PROGRAM INTERFACES, filed on the same day as this filing, bearing the contents of which are hereby incorporated by reference.

Some embodiments of the identity management system may implement techniques to implement homomorphic translation programs for translating between schemas, as described in a U.S. patent application No. 15/433,449, titled SELF-RECOMPOSING PROGRAM TO TRANSFORM DATA BETWEEN SCHEMAS, filed on the same day as this filing, bearing the contents of which are hereby incorporated by reference.

Figure 5:
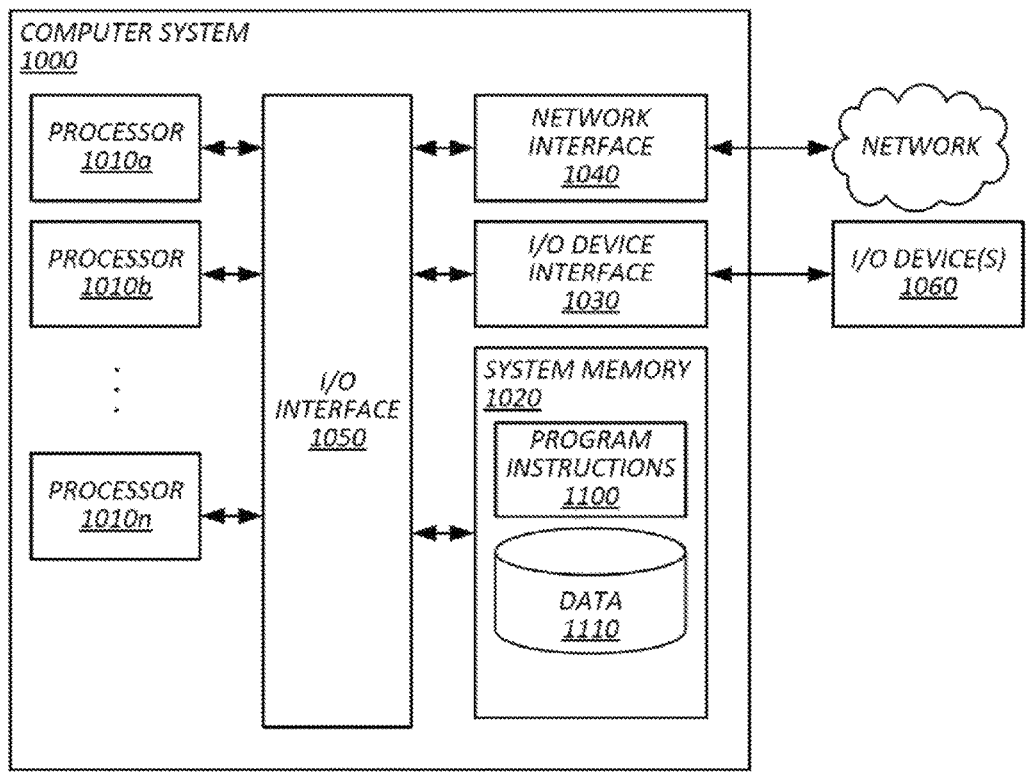
FIG. 5 is a block diagram of an example of a computer system by which the above techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several techniques. Rather than separating those techniques into multiple isolated patent applications, the inventors have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the disclosed techniques to the particular form disclosed, but to the contrary, the intention is to cover all modifications, equivalents, and alternatives falling within the spirit and scope of the present disclosed techniques as defined by the appended claims. Further modifications and alternative embodiments of various aspects of the disclosed techniques will be apparent to those skilled in the art in view of this description. Accordingly, this description and the drawings are to be construed as illustrative only and are for the purpose of teaching those skilled in the art the general manner of carrying out the disclosed techniques. Elements and materials may be substituted for those illustrated and described herein, parts and processes may be reversed or omitted, and certain features of the disclosed techniques may be utilized independently, all as would be apparent to one skilled in the art after having the benefit of this description. Changes may be made in the elements described herein without departing from the spirit and scope of the disclosed techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated clauses:

1. A method of validating data to be stored in a graph database, the method comprising: obtaining a first node to be stored in a graph database, the first node having a relationship to a second node in the graph database, the relationship corresponding to an edge to be added to the graph database; obtaining a node type of the first node, the node type being one of a plurality of node types of nodes in the graph database, each node type having a respective node-type schema specifying respective criteria to qualify as a valid node of the respective node type; forming, with one or more processors, from a plurality of schemas, a polymorphic schema specifying criteria to qualify as a valid instance of a node type of the first node, wherein forming a polymorphic schema comprises: accessing a first-node-type schema in memory corresponding to the node type of the first node, the first-node-type schema specifying a first criterion to determine whether the first node qualifies as a valid instance of the node type of the first node, determining that the first-node-type schema references a first referenced-schema, the first referenced-schema specifying a second criterion to determine whether the first node qualifies as a valid instance of the node type of the first node, and combining the first-node-type schema with the first referenced-schema in the polymorphic schema by determining whether the first criterion replaces or augments the second criterion; validating, with one or more processors, the first node with the polymorphic schema by determining that the first criterion is satisfied by the first node; and in response to validating the first node, storing the first node and the edge in the graph database.

2. The method of clause 1, wherein the first node includes at least part of an application program interface (API) response from a third party software-as-a-service (SaaS) application received in a hierarchical serialized data format; the first node corresponds to an account of a user of the third party server and contains as a parameter an account user name; the graph database comprises: user-type nodes corresponding to respective employees of an entity, account-type nodes corresponding to respective accounts of respective employees in respective SaaS applications, entity-type nodes corresponding to respective entities having employees corresponding to respective user-type nodes, edges linking user-type nodes to account-type nodes and corresponding to respective relationships between accounts and employees, and edges linking entity-type nodes to user-type nodes and corresponding to respective employment relationships between entities and employees; forming the polymorphic schema comprises combining the three or more schemas that are stored in a hierarchical arrangement of schemas in which child schemas inherit criteria from parent schemas; the hierarchical arrangement of schemas are retrieved from a document-oriented noSQL (structured query language) database storing the schemas in respective documents encoded in a hierarchical serialized data format; determining that the first-node-type schema references the first referenced-schema comprises determining that the child-node-type schema is a child schema of the first schema in the hierarchical arrangement of schemas; combining the first-node-type schema with the first referenced-schema in the polymorphic schema comprises determining that the first criterion augments the second criterion; the first criterion specifies that first property of the first node is required to qualify as a valid instance of the type of the first node; the second criterion specifies that the second node must be an entity-type node in the graph database or an account-type node in the graph database; and validating the record with the polymorphic schema comprises determining that the relationship of the record corresponds to an entity-type node in the graph database or an account-type node in the graph database to satisfy the second criterion.

3. The method of any of clauses 1-2, wherein determining that the first-node-type schema references the first referenced-schema comprises: parsing the first-node-type schema to obtain a sequence of tokens; determining that a subset of the sequence of tokens reference the first referenced-schema and indicate the first-node-type schema is a subtype of the first referenced-schema.

4. The method of any of clauses 1-3, wherein determining that the first-node-type schema references the first referenced-schema comprises: determining that the first-node-type schema inherits criteria from the first referenced-schema, wherein another node-type schema also inherits criteria from the first referenced-schema.

5. The method of any of clauses 1-4, wherein determining that the first-node-type schema references the first schema comprises: determining that the first-node-type schema references a plurality of other referenced-schemas of which the first-node-type schema is a composition.

6. The method of clause 5, wherein at least some of the plurality of other referenced-schemas are referenced by other node-type schemas, the other node-type schemas being compositions including respective ones of the at least some of the plurality of other schemas.

7. The method of any of clauses 1-6, wherein forming the polymorphic schema comprises: calling a function with the first-node-type schema as a parameter of the function call, wherein the function identifies schemas referenced by a schema serving as a parameter in a call to the function and recursively calls the function with identified schemas as parameters of the recursive function calls.

8. The method of any of clauses 1-7, wherein combining the first-node-type schema with the first referenced-schema comprises: determining that the first-node-type schema replaces the second criterion and augments a third criterion of the first referenced-schema and, in response, validating the record with the first criterion and the third criterion but not the second criterion.

9. The method of any of clauses 1-8, wherein forming the polymorphic schema comprises: determining that the first referenced-schema inherits criteria from a second referenced-schema, wherein the second referenced-schema applies to a set of node types, and wherein the first referenced-schema applies to a subset of the set of nodes types.

10. The method of any of clauses 1-9, comprising: obtaining a third node having the same node type as the first node; and after validating the first node, assessing validity of the third node by determining whether the third node satisfies criteria of the polymorphic schema.

11. The method of clause 10, wherein: the formed polymorphic schema is stored in program state after validating the first node; the formed polymorphic schema is accessed in program state to assess validity of the third node; and the polymorphic schema is not re-formed to assess validity of the third node.

12. The method of clause 10, wherein assessing validity of the third node comprises: determining that the third node is not valid with the polymorphic schema and, in response, emitting an error indicative of a criterion of the polymorphic schema that is not satisfied by the third node.

13. The method of any of clauses 1-12, wherein the polymorphic schema comprises: a criterion specifying that the record must include a value for a given property of the first node; and a criterion specifying that the graph database must include the second node with which the first node has the relationship;

14. The method of any of clauses 1-13, wherein forming a polymorphic schema comprises steps for forming a polymorphic schema.

15. The method of any of clauses 1-14, wherein validating the record with the polymorphic schema comprises steps for validating a record with the polymorphic schema.

16. The method of any of clauses 1-15, wherein the first referenced-schema specifies a partial reference indicating that a third criterion applies only if a schema incorporating the first referenced-schema incorporates a specified portion of the first referenced-schema.

17. The method of any of clauses 1-16, comprising: obtaining an indication that a user has a role in an organization; querying a data repository containing mappings of roles to accounts with the role to obtain an account to be created for the user on a remote application, wherein the first node corresponds to the account; and sending an instruction to the remote application to create the account.

18. A system, comprising: one or more processors; and memory storing instructions that when executed by at least some of the processors effectuate operations comprising: the operations of any of clauses 1-17.

19. A tangible, non-transitory, machine-readable medium storing instructions that when executed by a data processing apparatus cause the data processing apparatus to perform operations comprising: the operations of any of clauses 1-17.

What is claimed is:

1. A method of validating data to be stored in a graph database, the method comprising:
obtaining, with one or more processors, a first node to be stored in a graph database, the first node having a relationship to a second node in the graph database, the relationship corresponding to an edge to be added to the graph database;
obtaining, with one or more processors, a node type of the first node, the node type being one of a plurality of node types of nodes in the graph database, each node type having a respective node-type schema specifying respective criteria to qualify as a valid node of the respective node type;
forming, with one or more processors, from a plurality of schemas, a polymorphic schema specifying criteria to qualify as a valid instance of a node type of the first node, wherein forming a polymorphic schema comprises:
accessing a first-node-type schema in memory corresponding to the node type of the first node, the first-node-type schema specifying a first criterion to determine whether the first node qualifies as a valid instance of the node type of the first node,
determining that the first-node-type schema references a first referenced-schema, the first referenced-schema specifying a second criterion to determine whether the first node qualifies as a valid instance of the node type of the first node, and
combining the first-node-type schema with the first referenced-schema in the polymorphic schema by determining whether the first criterion replaces or augments the second criterion;
validating, with one or more processors, the first node with the polymorphic schema by determining that the first criterion is satisfied by the first node; and
in response to validating the first node, storing, with one or more processors, the first node and the edge in the graph database.

2. The method of claim 1, wherein
the first node includes at least part of an application program interface (API) response from a third party software-as-a-service (SaaS) application received in a hierarchical serialized data format;
the first node corresponds to an account of a user of the third party server and contains as a parameter an account user name;
the graph database comprises:
user-type nodes corresponding to respective employees of an entity,
account-type nodes corresponding to respective accounts of respective employees in respective SaaS applications,
entity-type nodes corresponding to respective entities having employees corresponding to respective user-type nodes, edges linking user-type nodes to account-type nodes and corresponding to respective relationships between accounts and employees, and edges linking entity-type nodes to user-type nodes and corresponding to respective employment relationships between entities and employees;

forming the polymorphic schema comprises combining the three or more schemas that are stored in a hierarchical arrangement of schemas in which child schemas inherit criteria from parent schemas;

the hierarchical arrangement of schemas are retrieved from a document-oriented noSQL (structured query language) database storing the schemas in respective documents encoded in a hierarchical serialized data format;

determining that the first-node-type schema references the first referenced-schema comprises determining that the child-node-type schema is a child schema of the first schema in the hierarchical arrangement of schemas;

combining the first-node-type schema with the first referenced-schema in the polymorphic schema comprises determining that the first criterion augments the second criterion;

the first criterion specifies that first property of the first node is required to qualify as a valid instance of the type of the first node;

the second criterion specifies that the second node must be an entity-type node in the graph database or an account-type node in the graph database; and validating the record with the polymorphic schema comprises determining that the relationship of the record corresponds to an entity-type node in the graph database or an account-type node in the graph database to satisfy the second criterion.

3. The method of claim 1, wherein determining that the first-node-type schema references the first referenced-schema comprises:

parsing the first-node-type schema to obtain a sequence of tokens;

determining that a subset of the sequence of tokens reference the first referenced-schema and indicate the first-node-type schema is a subtype of the first referenced-schema.

4. The method of claim 1, wherein determining that the first-node-type schema references the first referenced-schema comprises:

determining that the first-node-type schema inherits criteria from the first referenced-schema, wherein another node-type schema also inherits criteria from the first referenced-schema.

5. The method of claim 1, wherein determining that the first-node-type schema references the first schema comprises:

determining that the first-node-type schema references a plurality of other referenced-schemas of which the first-node-type schema is a composition.

6. The method of claim 5, wherein at least some of the plurality of other referenced-schemas are referenced by other node-type schemas, the other node-type schemas being compositions including respective ones of the at least some of the plurality of other schemas.

7. The method of claim 1, wherein forming the polymorphic schema comprises:

calling a function with the first-node-type schema as a parameter of the function call, wherein the function identifies schemas referenced by a schema serving as a parameter in a call to the function and recursively calls the function with identified schemas as parameters of the recursive function calls.

8. The method of claim 1, wherein combining the first-node-type schema with the first referenced-schema comprises:

determining that the first-node-type schema replaces the second criterion and augments a third criterion of the first referenced-schema and, in response, validating the record with the first criterion and the third criterion but not the second criterion.

9. The method of claim 1, wherein forming the polymorphic schema comprises:

determining that the first referenced-schema inherits criteria from a second referenced-schema, wherein the second referenced-schema applies to a set of node types, and wherein the first referenced-schema applies to a subset of the set of nodes types.

10. The method of claim 1, comprising:

obtaining a third node having the same node type as the first node; and after validating the first node, assessing validity of the third node by determining whether the third node satisfies criteria of the polymorphic schema.

11. The method of claim 10, wherein:

the formed polymorphic schema is stored in program state after validating the first node;

the formed polymorphic schema is accessed in program state to assess validity of the third node; and the polymorphic schema is not re-formed to assess validity of the third node.

12. The method of claim 10, wherein assessing validity of the third node comprises:

determining that the third node is not valid with the polymorphic schema and, in response, emitting an error indicative of a criterion of the polymorphic schema that is not satisfied by the third node.

13. The method of claim 1, wherein the polymorphic schema comprises:

a criterion specifying that the record must include a value for a given property of the first node; and a criterion specifying that the graph database must include the second node with which the first node has the relationship.

14. The method of claim 1, wherein forming a polymorphic schema comprises steps for forming a polymorphic schema.

15. The method of claim 1, wherein validating the record with the polymorphic schema comprises steps for validating a record with the polymorphic schema.

16. The method of claim 1, wherein the first referenced-schema specifies a partial reference indicating that a third criterion applies only if a schema incorporating the first referenced-schema incorporates a specified portion of the first referenced-schema.

17. The method of claim 1, comprising:

obtaining an indication that a user has a role in an organization;

querying a data repository containing mappings of roles to accounts with the role to obtain an account to be created for the user on a remote application, wherein the first node corresponds to the account; and sending an instruction to the remote application to create the account.

18. A system, comprising:

one or more processors; and memory storing instructions that when executed by at least some of the processors effectuate operations comprising:
- obtaining a first node to be stored in a graph database, the first node having a relationship to a second node in the graph database, the relationship corresponding to an edge to be added to the graph database;
- obtaining a node type of the first node, the node type being one of a plurality of node types of nodes in the graph database, each node type having a respective node-type schema specifying respective criteria to qualify as a valid node of the respective node type;
- forming, from a plurality of schemas, a polymorphic schema specifying criteria to qualify as a valid instance of a node type of the first node, wherein forming a polymorphic schema comprises:
  - accessing a first-node-type schema in memory corresponding to the node type of the first node, the first-node-type schema specifying a first criterion to determine whether the first node qualifies as a valid instance of the node type of the first node,
  - determining that the first-node-type schema references a first referenced-schema, the first referenced-schema specifying a second criterion to determine whether the first node qualifies as a valid instance of the node type of the first node, and
  - combining the first-node-type schema with the first referenced-schema in the polymorphic schema by determining whether the first criterion replaces or augments the second criterion;
- validating the first node with the polymorphic schema by determining that the first criterion is satisfied by the first node; and
- in response to validating the first node, storing the first node and the edge in the graph database.

19. The system of claim 18, wherein determining that the first-node-type schema references the first referenced-schema comprises:
determining that the first-node-type schema inherits from the first referenced-schema, wherein another node-type schema also inherits from the first referenced-schema.

20. The system of claim 18, wherein determining that the first-node-type schema references the first referenced-schema comprises:
determining that the first-node-type schema references a plurality of other referenced-schemas of which the first-node-type schema is a composition.

21. The system of claim 18, wherein combining the first-node-type schema with the first referenced-schema comprises:
determining that the first-node-type schema replaces the second criterion and augments a third criterion of the first referenced-schema and, in response, validating the record with the first criterion and the third criterion but not the second criterion.

22. The system of claim 18, the operations comprising:
obtaining a third node of the same node type as the first node; and
after validating the first node, assessing validity of the third node by determining whether the third node satisfies criteria of the polymorphic schema, wherein:
the formed polymorphic schema is stored in program state after validating the first node;
the formed polymorphic schema is accessed in program state to assess validity of the third node; and
the polymorphic schema is not re-formed to assess validity of the third node.

23. The system of claim 18, wherein the polymorphic schema comprises:
a criterion specifying that the record must include a value for a given property of the first node; and
a criterion specifying that the graph database must include the second node with which the first node has the relationship.

24. The system of claim 18, the operations comprising:
obtaining an indication that a user has a role in an organization;
querying a data repository containing mappings of roles to accounts with the role to obtain an account to be created for the user on a remote application, wherein the first node corresponds to the account; and
sending an instruction to the remote application to create the account.

* * * * *